UNITED STATES PATENT OFFICE.

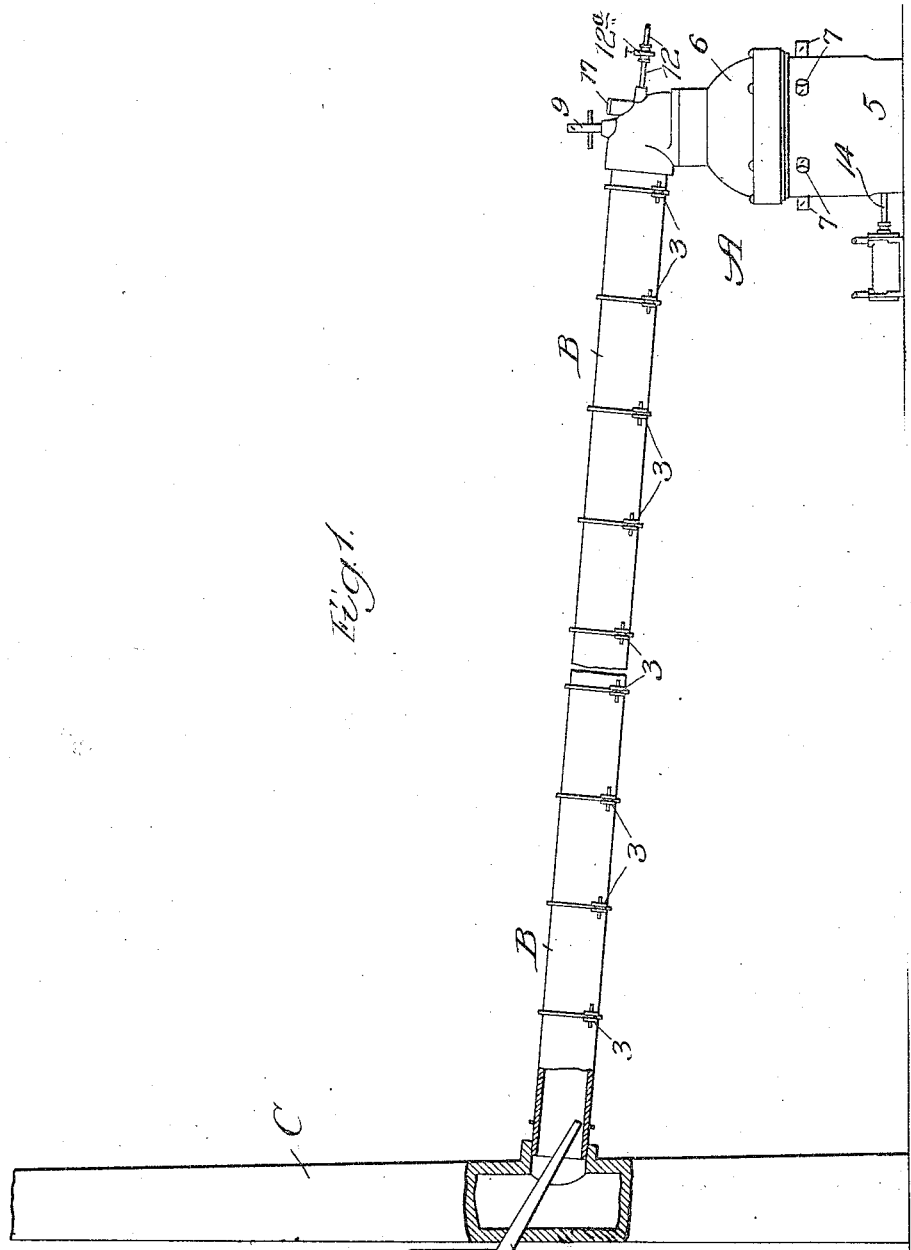

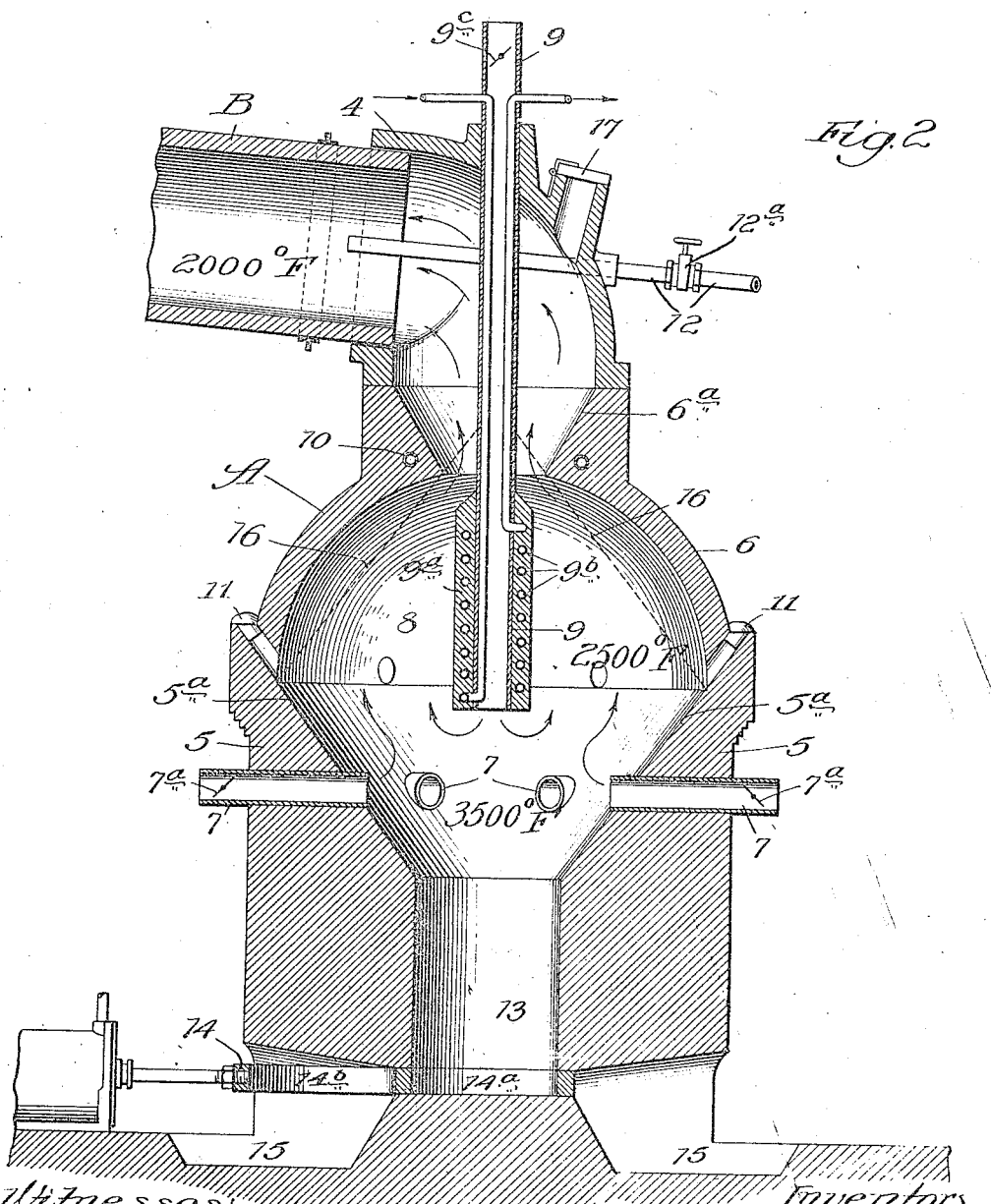

JOHN T. JONES AND ALBERT G. JONES, OF IRON MOUNTAIN, MICHIGAN, ASSIGNORS TO NEW METALS-PROCESS COMPANY, OF CHICAGO, ILLINOIS, A CORPORATION OF ILLINOIS.

ORE-REDUCING FURNACE.

1,174,732.

Specification of Letters Patent.

Patented Mar. 7, 1916.

Application filed March 26, 1914, Serial No. 827,476. Renewed January 26, 1916. Serial No. 74,491.

*To all whom it may concern:*

Be it known that we, JOHN T. JONES and ALBERT G. JONES, citizens of the United States, residing at Iron Mountain, in the county of Dickinson and State of Michigan, have invented a new and useful Improvement in Ore-Reducing Furnaces, of which the following is a specification.

The present invention relates particularly to furnaces adapted for metallizing ores; and the primary object is to provide a furnace of thoroughly practicable character which is adapted to the purpose of recovering, on a commercial scale and in a very pure state, and at a comparatively low cost, such metals as are commonly found in ores in the form of metal oxids or carbonates.

The improved furnace herein described is adapted to the practice of the process of metallizing ores which is described in Albert G. Jones' co-pending application No. 827,358 filed of even date herewith. In the practice of the process here referred to, the ore, mixed with relatively large proportions of solid fuel, is fed through a pre-heating-tube, and both ore and fuel are preparatorily heated and then fed through a de-oxidizing-chamber in which the heat is maintained at sufficiently high temperatures to rapidly de-oxidize the metal oxids or carbonates and fuse and globe the metals as they are produced, the ore-lump groups being maintained, during this treatment, sufficiently isolated from each other to prevent the production of a molten bath and any general fusing of the gangue or earthy constituents of the ore. Thus, in accordance with the process referred to, metal globes or globules, or masses thereof, of tangible size, varying in size from a very fine mesh product to a size of one inch or larger in dimensions, are produced, these metals being discharged with the coke or charcoal at the bottom of the furnace in solid form and being readily separable by any approved method. In the practice of the process, it is preferred to feed through the furnace with the ore solid fuel in block or lump form having several times the volume, and several times the weight, of the ore. For illustration, in treating an ore composed mainly of iron-oxid, good results are obtained by using with 250 pounds of ore 400 pounds of coke and 100 pounds of bituminous coal, thus affording approximately 2 pounds of fuel to each pound of ore, the cubic contents of the fuel being many times the cubic contents of the ore.

The invention is illustrated in its preferred embodiment in the accompanying drawings, in which—

Figure 1 represents a broken, elevational view of an ore-reducing furnace constructed in accordance with the invention; and Fig. 2, an enlarged broken vertical sectional view of the de-oxidizing-chamber and attendant parts.

In the construction illustrated, A represents a de-oxidizing-chamber or furnace; B, a pre-heating-device, preferably a slowly-rotating inclined tube; and C, a smoke-stack connected with the upper end of the tube B.

The ore and solid fuel are introduced into the pre-heating-tube through a hopper 1 which communicates therewith through an inclined chute 2 extending through the chimney C.

The tube B should be provided with a refractory lining. In a furnace having a capacity of approximately 100 tons per day, such as would be afforded by a de-oxidizing-chamber having a diameter of 20 feet, the tube is preferably of approximately 8 feet in diameter and 120 feet in length. The diameter of the smoke-stack may be 8 feet. The tube B is supported on rollers 3 and slowly rotated by any suitable means (not shown).

The pre-heated ore and fuel are discharged from the lower end of the tube B through an elbow 4 into the upper end of the de-oxidizing-chamber or furnace A. The chamber A is preferably of circular form, and may have the base-portion 5 provided with the frusto-conical downwardly-converging inner surface 5$^a$, the portion 5 being surmounted by the dome or hemispherical wall 6 which is provided at its upper end with the contracted opening 6$^a$, through which the ore and fuel enter from the elbow 4.

Through the walls of the base-portion 5 extend twyers 7 fitted with air-regulating-devices 7$^a$. Depending through the elbow 4 and through the upper portion 8 of the de-oxidizing-chamber is a central twyer 9 whose lower end is disposed somewhat above the plane of the twyers 7. The lower end of the twyer 9 is protected by refractory material 9$^a$ containing a water-coil 9$^b$. The upper end of the twyer 9 is fitted with an air-regulating-device 9ᶜ. The neck at the upper portion of the chamber A may be provided with a water-coil 10. If desired, the upper wall 6 of the chamber A may be provided with poker-openings fitted with plugs 11. Through the elbow 4 extends a twyer 12 fitted with an air-regulating-device 12ª, the twyer 12 serving to supply air to the lower portion of the pre-heating-device B.

The twyers 7 and 9 should be of ample size to admit sufficient air to provide a high heat at the inner ends of the twyers. In reducing iron-oxid ore, it is preferred to maintain the temperature at approximately 3500° F. in the vicinity of the inner ends of said twyers, carbon dioxid being produced at these points. As the gases pass upwardly, they change to de-oxidizing gases, and the temperature gradually decreases, somewhat as indicated in Fig. 2. The twyer 12 should be of ample size to provide sufficient air to burn such combustible gases as pass into the pre-heating tube. However, it is desirable to maintain a neutral or non-oxidizing gaseous medium in the preheater, such as will result when only sufficient air is supplied to burn the gaseous fuel, so that no free oxygen will remain to attack the solid fuel in the preheater. The temperature in the lower portion of the tube B is preferably maintained, in reducing iron-oxid, for illustration, at about 2000° F. The temperature decreases gradually as the upper end of the tube B is approached, and at the upper end of the tube the temeprature need not exceed about 500° F.

Preferably, the chamber A surmounts a soaking-pit 13, which may be of cylindrical form and which is adapted to receive the highly-heated mixture of ore and fuel as the charge settles down, the de-oxidizing action being continued in the soaking-pit.

The temperature decreases as the lower end of the pit is approached. Provision is made for discharging the metallized ore and coke (or charcoal) from the lower end of the pit 13. In the illustration given, a hydraulic ram or slide 14, provided with passages 14ª and 14ᵇ, is employed to discharge the materials into discharge-pits 15 or upon the ground, if desired. The pit 15 may contain water, or water may be directed upon the discharged materials by means of a hose, if desired, to quench the burning fuel, after which the fuel may be separated from the ore and charged again into the pre-heater with the desired charge of ore, and a relatively small amount of coal or wood may be charged directly into the de-oxidizing chamber through the door 17.

In the operation of the improved furnace, the ore, if hard, is preferably fed in a crushed condition, say of a size of 1 inch or less in dimensions, with a charge of distilled solid fuel through the hopper 1 into the upper end of the pre-heater B. As the pre-heater slowly rotates, the materials gravitate to the lower end thereof and are discharged into the de-oxidizing-chamber A. In this manner, the material may be practically continuously discharged into the de-oxidizing-chamber so as to keep the de-oxidizing-chamber full, or practically full, of a mixture of fuel and ore. In Fig. 2, the upper frusto-conical surface of the materials in the furnace is indicated by the dotted lines 16. In passing through the pre-heater, the ore and distilled solid fuel are highly pre-heated and thus are in condition to enable a rapid interchange of oxygen to take place in the de-oxidizing-chamber, where the temperature is maintained at a sufficiently high point to de-oxidize the metals and also fuse the metal particles and run them together in globes, or masses of globes, the ore-groups of clusters being, in effect, isolated from each other and enveloped by pieces, lumps, or blocks of solid carbonaceous fuel while this action takes place, so that no molten bath is formed, while any general fusing of the earthy materials or gangue of the ore is avoided. As the materials settle down into the soaking-pit, the de-oxidizing action upon the metal oxids continues, but as the lower end of the soaking-pit is approached, the temperature gradually becomes lower. In the passage of the ore and fuel through the de-oxidizing-chamber, myriads of minute metallized particles adhere to the coke or charcoal, and when this coke or charcoal is again fed through the furnace, these minute particles become fused and coalesce, forming globes, or globular masses, or masses of globes or globules, thus affording globes or masses of tangible size which may be separated or concentrated by any suitable method.

It is noteworthy that the pre-heating tube and smoke-stack are of comparatively large dimensions, so that the gases will pass freely therethrough, while the de-oxidizing chamber A is of relatively small height and large horizontal circumference or area, from which it follows that it is entirely practicable to carry on the metallizing operation by means of natural draft, thus avoiding the high expense incident to the operation of a tall blast-furnace which is universally employed in modern practice.

While the use of an air-blast is unnecessary, it is to be observed that if desired one could employ a blast in connection with the improved furnace, and such a blast could be operated at comparatively small expense, inasmuch as but small pressure would be required. Moreover, inasmuch as a very high percentage of the heat units are utilized in the improved furnace and the hydro-carbons distilled in the chamber A are utilized largely for de-oxidizing purposes, it will be understood that less air is used in the operation of the furnace than is necessary in the operation of a blast-furnace.

In additon to the foregoing considerations, it is highly desirable that opportunity should be afforded for the inevitable swelling of the fresh fuel in the upper portion of the de-oxidizing-chamber A and also that the materials, and particularly the iron, should be kept as much as possible out of contact with the lining of the de-oxidizing-chamber so that the walls of the chamber will not be destroyed. This result is accomplished in the construction herein described.

By means of the improved furnace, it is possible to produce almost pure iron. As is well known, wrought-iron possesses about twice the value of pig-iron on the market. It will thus be understood that the provision of a practical reducing-furnace which renders it entirely feasible to produce wrought-iron by a direct process is of far-reaching importance.

Manganese may be produced in comparatively large globular masses as well as in smaller but still thoroughly tangible globules, by the same treatment as has been described for iron-ore. Copper may be produced in the same manner, but it will require somewhat less fuel and may be produced by a somewhat lower temperature. Zinc and lead may be produced in the same manner and collected in a suitable condenser (none shown), it being noted that the vaporizing temperature of these metals is approximately 2200° F. Silver may be produced in the same manner as copper.

It may be noted also that it is entirely feasible, with the improved furnace herein described, to obtain metals by a direct process and without the use of fluxes. No lime need be added in the practice of the process. In ores containing a natural flux, such as a mixture of lime or magnesium, or both, with the more refractory silica, the slag-making constituents would be fused at a lower temperature than in the case of silica alone or lime alone. In any case, the operation should be so carried on as to avoid general fusing of the materials or production of a bath, it being highly important to prevent the contamination of the metals which occurs when all of the constituents are fused together, as is the case in blast practice.

In the furnace illustrated, the de-oxidizing-chamber at or near its median horizontal portion has a diameter of 20 feet and the height of the chamber above said median portion is approximately 10 feet, the upper portion of the chamber having the contracted opening 6ª. Below the median portion the inner surface of the chamber slopes downwardly and inwardly, as indicated. Preferably a plurality of the twyers 7 are employed. Eight of such twyers, each having a diameter of 23 inches, should be ample to furnish an air-supply to the lower portion of the reducing-chamber. The central vertical twyer 9 may have a diameter of 2 feet or more. The horizontal twyers are so opposed in pairs as to aid in general diffusion of the air through the burden.

The relatively small amount of fresh fuel containing hydro-carbons, such as bituminous coal or wood, is preferably charged directly into the de-oxidizing chamber through the charging device 17, so that the hydro-carbons, as they are distilled, are available as de-oxidizing gases.

While the central vertical twyer 9 is shown as depending from the top of the de-oxidizing chamber, the invention is not limited to such arrangement, nor to the use of a single central or intermediate vertical twyer.

The foregoing detailed description has been given for clearness of understanding only, and no unnecessary limitation should be understood therefrom, but the appended claims should be construed as broadly as permissible in view of the prior art.

What we regard as new, and desire to secure by Letters Patent, is:—

1. In an ore-reducing furnace, the combination of a pre-heating device through which a mixture of ore and solid fuel may be fed, an upright de-oxidizing chamber adapted to receive and support a stack of mixed ore and fuel and having its upper portion communicating with said pre-heating device, and means for supplying air in limited quantity to the lower portion of the de-oxidizing-chamber.

2. In an ore-reducing furnace, the combination of a relatively large dimensioned, inclined pre-heating tube through which ore and solid fuel may be fed slowly, a large area, low-height de-oxidizing chamber having its upper portion communicating with the lower end of said pre-heating tube, means for charging fresh solid fuel containing hydro-carbons into the upper portion of said de-oxidizing chamber and twyers adapted to deliver air to the interior of the de-oxidizing-chamber at a comparatively short distance below the gas outlet of the de-oxidizing-chamber.

3. In an ore-reducing furnace, the combination of a relatively large-dimensioned, inclined pre-heating tube through which ore and solid fuel may be fed slowly, a large-area, low-height de-oxidizing-chamber having its upper portion communicating with the lower end of said pre-heating tube, twyers adapted to deliver air to the interior of the de-oxidizing-chamber at a comparatively short distance below the gas outlet of the de-oxidizing-chamber, and means for admitting air to the lower portion of the pre-heating tube.

4. In an ore-reducing furnace, the combination of a relatively long pre-heating tube of large diameter, through which a mixture of ore and solid fuel may be fed slowly, a relatively low de-oxidizing-chamber having its upper portion communicating with the lower end of said pre-heating tube, and twyers adapted to deliver air to the interior of said de-oxidizing-chamber in sufficient quantity to produce a hot de-oxidizing-temperature and fuse and globe the metal as it is produced in said de-oxidizing-chamber.

5. In an ore-reducing furnace, the combination of a relatively long pre-heating tube of large diameter, through which a mixture of ore and solid fuel may be fed slowly, a relatively low de-oxidizing-chamber having its upper portion communicating with the lower end of said pre-heating tube, twyers adapted to deliver air to the interior of said de-oxidizing-chamber in sufficient quantity to produce a hot de-oxidizing-temperature and fuse and globe the metal as it is produced in said de-oxidizing-chamber, and means for delivering air to said pre-heating-chamber in sufficient quantity to burn the combustible gases therein.

6. In an ore-reducing furnace, the combination of a relatively large dimensioned pre-heating device through which ore and solid fuel may be fed slowly, a relatively-low de-oxidizing-chamber having its upper portion communicating with said pre-heating device, and a down-draft twyer depending into said de-oxidizing-chamber.

7. In an ore-reducing furnace, the combination of a relatively large-dimensioned pre-heating device through which ore and solid fuel may be fed slowly, a relatively-low de-oxidizing-chamber having its upper portion communicating with said pre-heating device, a down-draft twyer depending into said de-oxidizing-chamber, and twyers extending through the lateral walls of said de-oxidizing-chamber.

8. In an ore-reducing furnace, the combination of a relatively large-dimensioned pre-heating device through which ore and solid fuel may be fed slowly, a relatively-low de-oxidizing-chamber having its upper portion communicating with said pre-heating-device, a down-draft twyer depending into said de-oxidizing-chamber, and twyers extending through the lateral walls of said de-oxidizing-chamber below the lower end of said first-named twyer.

9. In an ore-reducing furnace, the combination of a relatively large-dimensioned pre-heating tube through which ore and solid fuel may be fed slowly, an elbow communicating with the lower end of said tube, a relatively low de-oxidizing-chamber surmounted by said elbow, and a down-draft twyer extending through said elbow and depending some distance below the upper end of said de-oxidizing-chamber.

10. In an ore-reducing furnace, the combination of a relatively large dimensioned pre-heating tube through which ore and solid fuel may be fed slowly, an elbow communicating with the lower end of said tube, a relatively-low de-oxidizing-chamber surmounted by said elbow, a down-draft twyer extending through said elbow and depending some distance below the upper end of said de-oxidizing-chamber, and twyers extending through the lateral walls of the de-oxidizing-chamber.

11. In an ore-reducing furnace, the combination of a relatively large-dimensioned, inclined pre-heating tube through which ore and solid fuel may be fed slowly, a large-area, low-height de-oxidizing-chamber communicating at its upper end with the lower end of said pre-heating tube, twyers adapted to deliver air within the ore and fuel body in said de-oxidizing-chamber, and a soaking-pit forming a downward continuation of the de-oxidizing-chamber below said twyers.

12. In an ore-reducing furnace, the combination of a relatively large-dimensioned inclined pre-heating tube through which ore and solid fuel may be fed slowly, an elbow communicating with the lower end of said pre-heating tube, a relatively-low, large-area de-oxidizing-chamber having a contracted opening at its upper end communicating with said elbow, twyers adapted to deliver air within the ore body in said de-oxidizing-chamber, and a soaking-pit forming a downward continuation of the de-oxidizing-chamber below said twyers, means for delivering air to the lower portion of said pre-heating tube, and means for discharging the ore and fuel at the bottom of the soaking-pit.

13. In an ore-reducing furnace, the combination of a relatively large-dimensioned, inclined pre-heating-tube through which ore and solid fuel may be fed slowly, a de-oxidizing-chamber having a relatively low dome-shaped upper portion with a contracted outlet communicating with the lower end of said pre-heating tube and having also a downwardly-contracting base-portion, twyers adapted to deliver air within the ore and fuel body in said de-oxidizing-chamber in sufficient quantity to produce a hot de-oxidizing and metal-fusing temperature, sufficient to fuse and globe the metals as they are produced, and means for supplying air to combine with the combustible gases in the pre-heating tube.

14. In an ore-reducing furnace, the combination of a relatively large-dimensioned, inclined pre-heating tube through which ore and solid fuel may be fed slowly, a de-oxidizing-chamber having its upper portion communicating with the lower portion of said pre-heating tube, a natural-draft downtake air-twyer depending through the upper portion of said de-oxidizing-chamber, and a smoke-stack communicating with the upper end of said pre-heating tube.

15. In an ore-reducing furnace, the combination of a relatively large-dimensioned, inclined pre-heating tube through which ore and solid fuel may be fed slowly, a de-oxidizing-chamber having its upper portion communicating with the lower portion of said pre-heating tube, a natural-draft downtake air-twyer depending through the upper portion of said de-oxidizing-chamber, a smoke-stack communicating with the upper end of said pre-heating tube, and natural-draft air-twyers extending through the lateral walls of said de-oxidizing-chamber, said twyers being adapted to supply air in sufficient quantity to maintain a hot de-oxidizing and metal-fusing and globing temperature within said de-oxidizing-chamber.

16. In an ore-reducing furnace, the combination of a relatively large-dimensioned, inclined pre-heating tube through which ore and solid fuel may be fed slowly, a de-oxidizing-chamber having its upper portion communicating with the lower portion of said pre-heating tube, a natural-draft downtake air-twyer depending through the upper portion of said de-oxidizing-chamber, a smoke-stack communicating with the upper end of said pre-heating tube, natural-draft air-twyers extending through the lateral walls of said de-oxidizing-chamber, said twyers being adapted to supply air in sufficient quantity to maintain a hot de-oxidizing and metal-fusing and globing temperature within said de-oxidizing chamber, and means for supplying air by natural draft to the lower portion of said pre-heating tube to combine with the combustible gases in said pre-heating tube.

17. In an ore-reducing furnace, the combination of a relatively large-dimensioned inclined pre-heating tube, a smoke-stack connected with the upper end thereof, an elbow communicating with the lower end of said pre-heating tube, a relatively-low, large-area de-oxidizing-chamber surmounted by said elbow, natural-draft twyers adapted to deliver air within the ore body in said de-oxidizing-chamber in sufficient quantity to maintain a high de-oxidizing and metal-fusing temperature therein, and a soaking-pit below said twyers into which the metallized ore and fuel settle by gravity.

18. In an ore-reducing furnace, the combination of a pre-heating device in and through which ore and solid fuel may be supported and fed, a low de-oxidizing chamber adapted to contain a low stack of ore and solid fuel and having its upper portion disposed to receive materials from the pre-heating device, and a substantially vertical intermediate air-twyer which extends into the stack in said de-oxidizing chamber.

19. In an ore-reducing furnace, the combination of a pre-heating device in and through which ore and solid fuel may be supported and fed, a low de-oxidizing chamber adapted to contain a low stack of ore and solid fuel and having its upper portion disposed to receive materials from the pre-heating device, a substantially vertical intermediate air-twyer which extends into the stack in said de-oxidizing chamber, and lateral twyers projecting into the stack in said de-oxidizing chamber.

20. In an ore-reducing furnace, the combination of a pre-heating device in and through which ore and solid fuel may be supported and fed, a low de-oxidizing chamber adapted to contain a low stack of ore and solid fuel and having its upper portion disposed to receive materials from the pre-heating device, a substantially vertical intermediate air-twyer which extends into the stack in said de-oxidizing chamber, lateral twyers projecting into the stack in said de-oxidizing chamber, and means for charging fresh fuel directly into the de-oxidizing chamber.

JOHN T. JONES.
ALBERT G. JONES.

In presence of—
 NELLIE B. DEARBORN,
 E. D. SETTLE.